Figure 1:
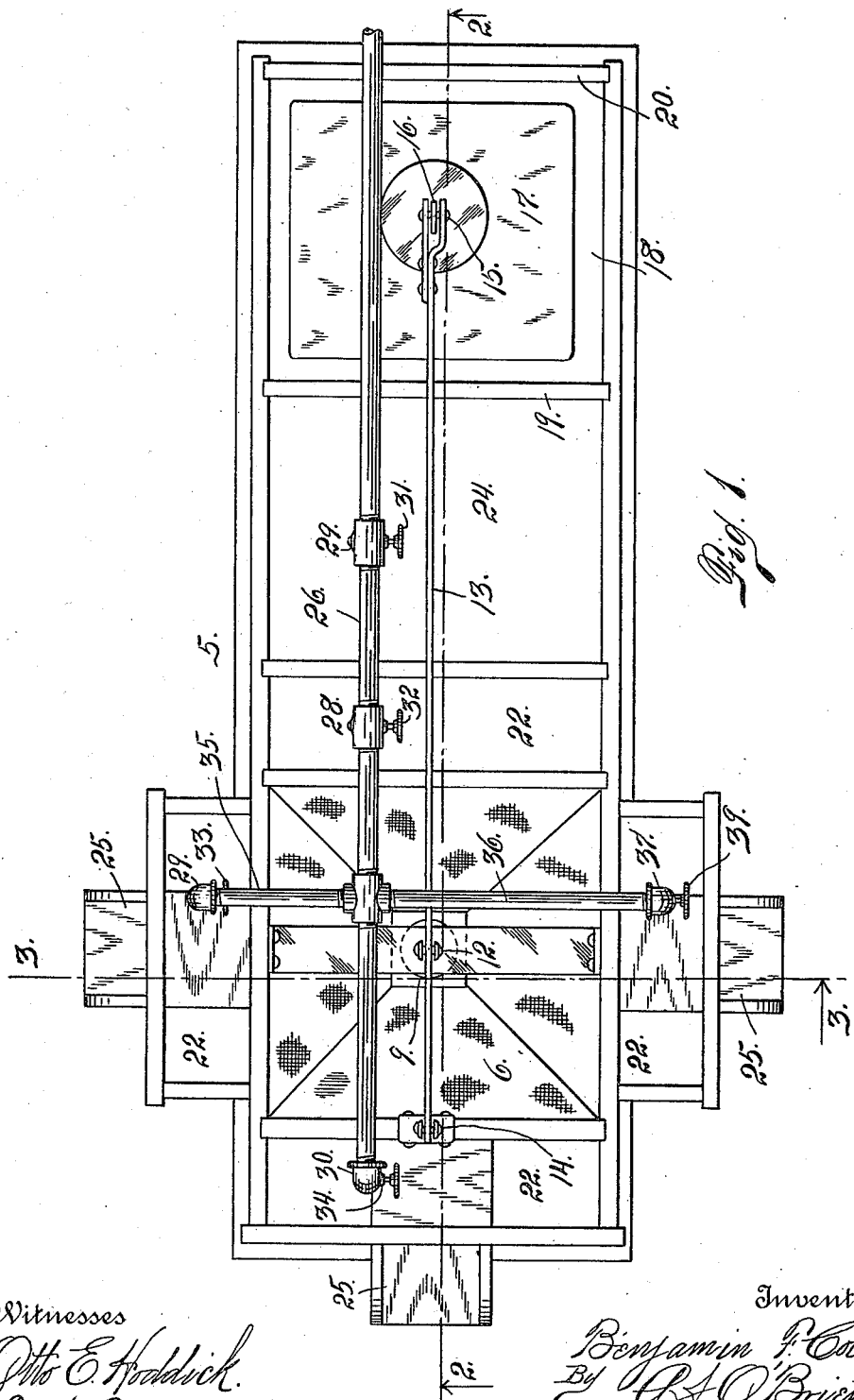

B. F. COBB.
ORE CONCENTRATOR.
APPLICATION FILED JULY 15, 1910.

996,834.

Patented July 4, 1911.
3 SHEETS—SHEET 1.

Witnesses
Otto E. Hoddick.
C. H. Roesener.

Inventor
Benjamin F. Cobb.
By C. J. O'Brien
Attorney

B. F. COBB.
ORE CONCENTRATOR.
APPLICATION FILED JULY 15, 1910.

996,834.

Patented July 4, 1911.
3 SHEETS—SHEET 3.

Witnesses
Otto E. Hoddick.
C. H. Roessner.

Inventor
Benjamin F. Cobb.
By A. J. O'Brien.
Attorney

UNITED STATES PATENT OFFICE.

BENJAMIN FRANKLIN COBB, OF DENVER, COLORADO.

ORE-CONCENTRATOR.

996,834. Specification of Letters Patent. Patented July 4, 1911.

Application filed July 15, 1910. Serial No. 572,171.

*To all whom it may concern:*

Be it known that I, BENJAMIN FRANKLIN COBB, a citizen of the United States, residing in the city and county of Denver and State of Colorado, have invented certain new and useful Improvements in Ore-Concentrators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in ore concentrators, my object being to provide a simple and efficient construction whereby the gangue is separated from the metallic values of the ore through the action of an upward current of water which enters the tank at a predetermined low point and escapes at a predetermined high level, whereby an upward current in the tank containing the material under treatment is produced, the gangue being carried upwardly by the water while the ore settles down in the botton of the tank, the separation being effected by virtue of the difference in specific gravity between the ore values and the gangue.

The bottom of the tank is preferably cone-shaped and composed of mesh material of sufficient fineness to retain the ore particles which pass downwardly, being caught in the conical bottom of the tank below the level where the separating water is introduced. Water is also caused to pass upwardly through the screen bottom of the tank by introducing the same into a larger tank with which the lower part of the ore tank communicates, the latter being in fact a compartment of the large tank rather than a distinct receptacle. By virtue of this secondary water, any particles of gangue which may have been carried downwardly with the ore particles or metallic values, are separated therefrom and carried upwardly, where they are also acted upon by the upwardly directed current resulting from the introduction of the water above the cone-shaped bottom of the ore compartment as heretofore explained.

The secondary water continues to pass through the screen bottom of the ore compartment until the said bottom becomes clogged with the concentrates, in which event the upward passage of the secondary water therethrough is stopped, causing the water to rise in the tank outside of the ore compartment and act upon a float connected with one end of a lever, the latter being connected with a valve located in the bottom of the ore compartment. As the float rises it acts upon the lever to open this valve and allow the concentrates to pass out through an opening in the bottom of the tank. As soon as this occurs the screen bottom is cleared of concentrates, the water again passes up through the mesh bottom of the ore compartment and its level falls sufficiently to cause the float to assume such a position as to close the valve. As soon as this occurs the operation goes on with the result heretofore specified.

Having briefly outlined my improved construction, I will proceed to describe the same in detail, reference being made to the accompanying drawing in which is illustrated an embodiment thereof.

Figure 2:
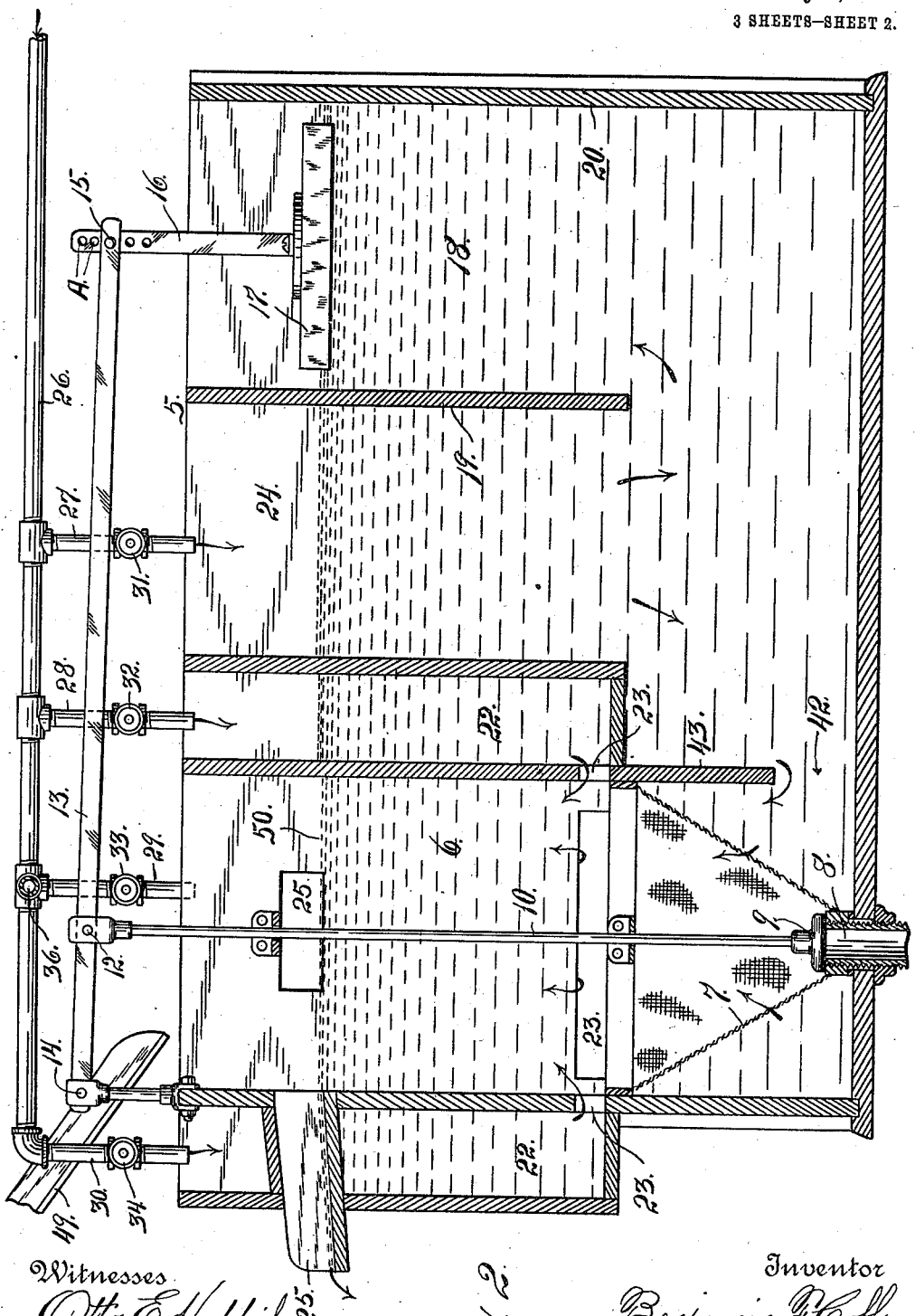
Figure 3:
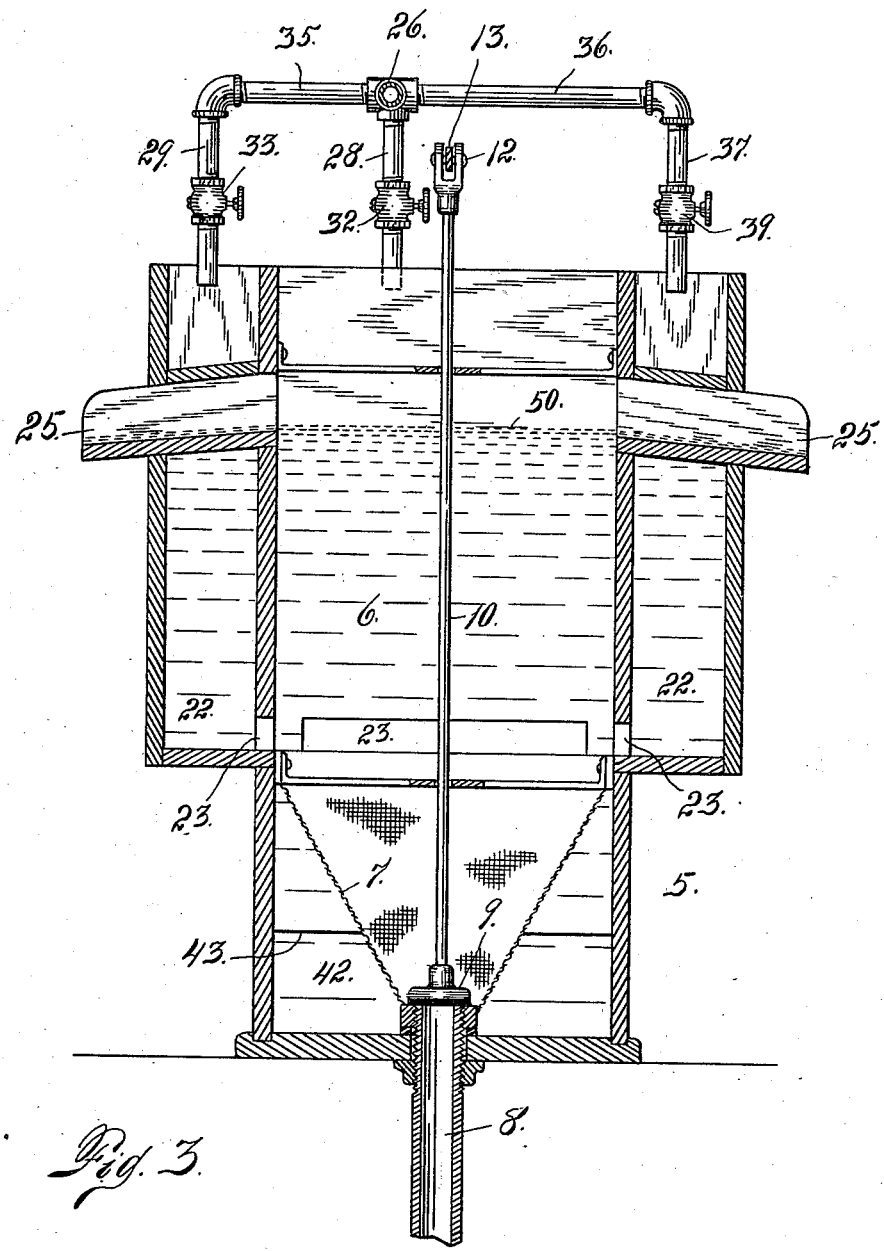

In this drawing: Figure 1 is a top plan view of my improved concentrating apparatus. Fig. 2 is a vertical section taken on the line 2—2 Fig. 1. Fig. 3 is a section taken on the line 3—3 Fig. 1.

The same reference characters indicate the same parts in all the views.

Let the numeral 5 designate the tank considered in its entirety and having an ore compartment 6 whose lower portion consists of a cone-shaped screen bottom 7, provided with an outlet passage 8 at its lower extremity, the said passage being normally closed by a valve 9 attached to the lower extremity of a stem 10, the upper extremity of the stem being connected as shown at 12 with a lever 13, one end of which is pivoted as shown at 14 while its opposite extremity is connected as shown at 15 with a vertical arm 16 of a float 17 located in a float compartment 18 of the tank. The float arm 16 is provided with a series of perforations A, whereby the lever 13 is made vertically adjustable on the arm. The compartment 18 is located between a partition 19 and one end 20 of the tank. By virtue of the partition 19, the water which enters the tank as hereinafter explained, is prevented from interfering with the action of the float.

The ore compartment 6 of the tank is provided on each of its four sides with a pocket 22 located outside of the body of the ore compartment and communicating therewith through an opening 23 located at the bottom of the pocket, whereby the separating water is allowed to enter the ore compartment just above the screen bottom 7. Each of these compartments except the one adjacent the main water compartment 24 of the tank, is provided with an outlet trough 25, which is cased in and therefore has no communication with the pocket through which it passes. Each outlet trough communicates at its inner extremity with the ore compartment at a predetermined high level, so that the water introduced through the pockets 22 and the port 23, may serve to produce an upward current within the compartment 6, whereby the gangue is separated from the values as heretofore described.

Mounted above the tank is a water pipe 26, having depending branches 27, 28 and 30, the said branches being respectively equipped with valves 31, 32 and 34. Extending from the main pipe 26 are horizontally arranged branch pipes 35 and 36 having depending members 29 and 37 equipped with valves 33 and 39 respectively.

When the apparatus is in use, water is supplied to the main tank by way of the depending member 27, the said water entering directly into the compartment 24 between one of the pockets 22 and the compartment 19. The compartments 18 and 24 are open at the bottom so that the water entering the compartment 24 rises in the compartment 18. The ore compartment 6 communicates with the main tank by way of an opening 42 between the bottom of the tank and a partition member 43 extending downwardly from the bottom of one of the pockets 22 and forming a sort of baffle wall to prevent the water from passing through the screen bottom of the ore compartment until after it has passed through the opening 42, thus compelling the water as it passes through the screen to take an upward course, whereby a better separating action is attained. The water enters the four compartments 22 by way of the depending pipe members 28, 29, 30 and 37 respectively. The depending members 29 and 37 extend downwardly from the extremities of the horizontally arranged branch pipes 35 and 36, the said depending pipe members being equipped with valves 33 and 39 respectively, as heretofore explained.

When the apparatus is in use the ore to be treated is fed into the top of the compartment 6 through an ore chute 49 or in any other suitable manner. Simultaneously with the entrance of the ore into the said compartment, water is delivered to the tank and to the pockets 22 of the ore compartment through the agency of the various pipe members as heretofore explained. Hence as the ore falls into the water of the compartment 6, which it may be assumed is at its highest level, being that indicated by the dotted line 50 when the operation begins, an upward current of water is produced in the ore compartment in the manner heretofore explained, whereby the gangue which is lighter than the concentrates, is separated from the latter and carried upwardly, flowing out with the water through the troughs 25, while the concentrates pass downwardly into the cone-shaped screen-surrounded bottom of the tank and settle therein. The water which enters the compartment 6 through the screen bottom of the tank, also produces an upward current and has a tendency to separate any remaining particles of gangue that may have been carried downwardly with the concentrates. When, however, the screen bottom of the tank contains such a quantity of concentrates as to prevent the entrance of water through the screen, the water which enters the tank through the pipe member 27, will rise in the compartments 18 and 24, with the result that the float in the compartment 18 is caused to rise sufficiently to lift the lever 13 and open the valve 9 by virtue of the connection between the lever and the valve stem 10 as heretofore explained. The concentrates which have collected in the bottom of the ore compartment will then escape through the outlet 8 at the bottom of the tank. As soon as this occurs the water level in the compartments 24 and 18 will fall until it corresponds with that in the ore compartment 6, since the water will rise through the screen bottom 7 after the latter has been cleared of concentrates as heretofore explained, after which the ore separating operation will proceed as heretofore explained.

Having thus described my invention, what I claim is:

1. An ore concentrator having an ore compartment provided with a screen bottom and pockets arranged adjacent the outer wall of the compartment above the screen bottom, the said pockets communicating with the compartment above the screen bottom, means for feeding water separately into each of the pockets, the ore compartment being provided with outlets located at a predetermined level above the inlets from the pockets, the said outlets consisting of troughs passing through the pockets and being cased in, whereby there is no communication with the pockets, and means for feeding the ore to be treated into the ore compartment above the level of the inlets from the pockets, substantially as described.

2. An ore concentrator having an ore compartment and provided with a series of pockets adjacent the compartment and communicating therewith at a predetermined level above the bottom of the compartment, means for feeding water separately into each of the pockets, the ore compartment being provided with outlets located at a predetermined level above the water inlets from the pockets, and means for feeding the ore to be treated into the ore compartment above the inlets from the pockets, substantially as described.

3. A concentrator comprising an ore compartment having a screen bottom and pockets surrounding the ore compartment and having openings at their bottoms communicating with the ore compartment above the screen bottom thereof, the ore compartment having outlets above the inlets from the pockets, the bottom of the compartment having a valve controlled outlet opening, a water compartment communicating with the screen bottom of the ore compartment, a float located within the said water compartment, a lever with which the float is connected, a stem connecting the said valve with the lever, and means for introducing the material to be treated into the top of the ore compartment.

In testimony whereof I affix my signature in presence of two witnesses.

BENJAMIN FRANKLIN COBB.

Witnesses:
F. E. BOWEN,
HORTENSE UHLRICH.

Copies of this patent may be obtained for five cents each, by addressing the "Commissioner of Patents, Washington, D. C."